United States Patent [19]
Matoba et al.

[11] Patent Number: 5,311,490
[45] Date of Patent: May 10, 1994

[54] ACCESS CONTROLLING DEVICE FOR USE IN AN OPTICAL DISK DRIVE

[75] Inventors: Hirotsugu Matoba, Sakurai; Masaru Nomura, Tenri; Takeshi Yamaguchi, Osakasayama; Kunio Kojima, Nara; Shigeo Terashima, Tenri, all of Japan

[73] Assignee: Sharp Kabushiki Kaisha, Osaka, Japan

[21] Appl. No.: 809,772

[22] Filed: Dec. 18, 1991

[30] Foreign Application Priority Data

Dec. 19, 1990 [JP] Japan ................................ 2-403788

[51] Int. Cl.$^5$ ................................................ G11B 7/00
[52] U.S. Cl. .............................. 369/44.28; 369/44.26; 369/44.29; 369/44.34; 369/54
[58] Field of Search ............... 369/44.27, 44.28, 44.29, 369/44.32, 44.35, 44.11, 51, 58, 44.25, 44.26, 44.34, 54

[56] References Cited

U.S. PATENT DOCUMENTS

| | | | |
|---|---|---|---|
| 4,807,210 | 2/1989 | Kaku et al. | 369/44.26 |
| 4,879,707 | 11/1989 | Getreuer et al. | 369/44.28 |
| 5,001,732 | 3/1991 | Nomura et al. | 369/44.26 |

FOREIGN PATENT DOCUMENTS 1004986 1/1989 Japan .
1060823 3/1989 Japan .

Primary Examiner—Aristotelis Psitos
Assistant Examiner—Muhammad Edun
Attorney, Agent, or Firm—David G. Conlin; Robert F. O'Connell

[57] ABSTRACT

An optical disk drive which discriminates whether a light spot is incident on a groove or on an area therebetween by eliminating a pulse that appears in a binary envelope signal when the light spot passes a level section. The elimination is carried out based on an ODF section detecting signal, the ODF section detecting signal being a level section detecting signal which is produced by detecting a level section (ODF section) of the optical disk. The detection is carried out by differentiating an envelope signal, which is the envelope of an electric signal corresponding to the amount of light reflected from the optical disk. Accordingly, even if the optical disk in use has interrupted grooves, the optical head can be accurately moved to a desired track located on a land or on a groove.

8 Claims, 9 Drawing Sheets

ACCESS CONTROLLING DEVICE FOR USE IN AN OPTICAL DISK DRIVE

FIELD OF THE INVENTION

The present invention relates to an optical disk drive which records, reproduces or erases information on/from an optical disk, and specifically to an access control for moving an optical head to a desired track.

BACKGROUND OF THE INVENTION

There are several different track access methods in conventional optical disk drives. Among these, there is a method known as the track count method according to which the number of pulses of a detected track crossing signal are counted and the optical head is moved to a desired track by moving means such as a linear motor, all the while detecting the current position of the optical head based on the number of tracks crossed.

The conventional track count method is described hereinbelow. As shown in FIG. 7(a), guiding grooves 1 are provided at specified intervals on the surface of an optical disk, tracks 2 being formed between the guiding grooves 1. ID sections 3 are provided on the tracks 2. Each of the ID sections 3 shows a track number and a sector number etc. The information in the ID sections 3 is predeterminedly recorded by means of uneven pits having a specified depth (shown by hatching; individual pits are not shown).

During track access, although a light spot 4 moves in a direction orthogonal to or substantially orthogonal to the tracks 2, normally, since the optical disk is rotating during track access, a line 5 connecting the areas where the light spot 4 is incident on the optical disk becomes diagonal with respect to the tracks 2. Here, the light spot 4 is regarded as moving from an inner circumference toward an outer circumference within the region A-B shown in the Figure, and from the outer circumference toward the inner circumference within the region B-C.

FIGS. 7(b) and 7(c) respectively show the transition of a tracking error signal 6 and the transition of a total signal 7 when the light spot 4 moves as described above. The tracking error signal 6 is at zero level in a central section of each of the tracks 2 and the total signal 7 is at the maximum level in the central section of each of the tracks 2. Further, the tracking error signal 6 and the total signal 7 are modulated by the uneven pits when the light spot 4 passes the ID sections 3. As a result, jagged waveforms 6a and 7a, which include high-frequency components, appear.

In the case where a light detector (not shown) divided into two regions is used, the tracking error signal 6 is a difference, and the total signal 7 a sum of output signals released from each light receiving section of the light detector.

An envelope signal 10 shown in FIG. 7(d) is achieved by entering the total signal 7 into an envelope circuit 8 shown in FIG. 8. As a result, a waveform 10a of the envelope signal 10 corresponding to the ID sections 3 becomes substantially smooth. The envelope circuit 8 comprises an operational amplifier 11, a diode 12 connected to a non-inverting input terminal of the operational amplifier 11, and a capacitor 13 and resistor 14 connected in parallel between the non-inverting input terminal and the ground.

FIG. 7(e) shows a binary tracking error signal 15 which is a binary version of the tracking error signal 6.

FIG. 7(f) shows a land-groove discrimination signal 17 achieved by comparing the envelope signal 10 with a specified slice level 16 using a comparator, not shown, and then binarizing it. When the light spot 4 is on one of the guiding grooves 1 (grooves), the land-groove discrimination signal 17 falls to a low level; when the light spot 4 is on one of the tracks 2 (lands), the land-groove discrimination signal 17 rises to a high level.

FIG. 7(g) shows a directional signal 18 which is achieved by latching the level of the land-groove discrimination signal 17 with the rising time of the binary tracking error signal 15. When the light spot 4 moves from the inner circumference to the outer circumference, the directional signal 18 falls to a low level; when the light spot 4 moves from the outer circumference to the inner circumference, the directional signal 18 rises to a high level.

An edge detecting signal 20 shown in FIG. 7(h) is a pulse which is released for a specified time when the binary tracking error signal 15 begins to rise. The edge detecting signal 20 corresponds to the timing with which the light spot 4 crosses the guiding grooves 1 when it moves from the inner to the outer circumference, and to the timing with which the light spot 4 crosses the tracks 2 when it moves from the outer to the inner circumference.

An up-signal 21 shown in FIG. 7(i) and a down-signal 22 shown in FIG. 7(j) are signals that are respectively achieved according to the edge detecting signal 20 in response to the logic level of the directional signal 18. That is, when the directional signal 18 is at a low level, the up-signal 21 is produced from the edge detecting signal 20; when at a high level, the down-signal 22 is produced. The number of pulses of the up-signal 21 correspond to the number of tracks 2 the light spot 4 crosses from the inner circumference to the outer circumference, and the number of pulses of the down-signal 22 correspond to the number of tracks 2 the light spot 4 crosses while moving from the outer circumference to the inner circumference of the optical disk.

Consequently, the amount by which the optical head moves in the radial directions of the optical disk can be detected by counting the up-signal 21 and the down-signal 22 using an up-down counter, not shown.

However, in optical disk drives of the track count type, it may happen that the amount by which the optical head moves in the radial directions of the optical disk cannot be detected accurately. Such a case is discussed hereinbelow.

FIGS. 9(b)–(j) show the transition of each signal of an optical disk using a Composite Continuous Format. Those signals having the same numbers as in FIG. 7 are the same signals as in FIG. 7.

As shown in FIG. 9(a), in the optical disk having this format, an ODF (Offset Detection Flag) section 23 is provided by interrupting guiding grooves 1 at specified intervals toward the posterior side of ID sections 3. A brief explanation regarding the ODF section 23 follows.

In optical disk drives which use rewritable-type optical disks, in order to ensure the power of the light beam during recording, and so on, the push-pull method, relying on a one-beam system, is commonly used for detecting tracking error. However, in this push-pull method, if an inclination of the radial directions of the optical disk or an abnormality in the angle of incidence of the light path etc. exists, a DC offset appears in a tracking error signal. That is, a problem occurs in that even if the tracking error signal is "0", it may happen that the light beam is not positioned on the center of a track.

The ODF section 23 is provided in order to resolve this problem. That is, the ODF 23 is a mirror-surface section whereon grooves and pits do not exist; therefore, no light diffraction takes place. As a result, the tracking error signal corresponding to the ODF section 23 should be "0". When, however, the tracking error signal corresponding to the ODF section 23 is not "0", this shows that an inclination of the optical disk, or an abnormality in the angle of incidence of the light path of the light beam has occurred. Consequently, when tracking control is being carried out, if the tracking error signal at the time when the light beam passes the ODF section 23 is detected and is used to correct the DC offset, the problem of the shifting of the light spot 4 from the tracks can be resolved.

Here, when a light spot 4 passes the ODF section 23, a tracking error signal 6 (FIG. 9(b)) falls to zero level, having a constant waveform 6b. A total signal 7 (FIG. 9(c)) rises to high level, having a constant waveform 7b.

When a total signal 7 is entered into the envelope circuit 8 shown in FIG. 8, a high charge builds up in the capacitor 13. Consequently, even after the light spot 4 has passed the ODF section 23, quite a lot of charge remains for a while in the capacitor 13. As a result, an envelope signal 10 acquires an attenuated waveform 10b, as shown in FIG. 9(d).

A land-groove discrimination signal 17, shown in FIG. 9(f), is achieved by comparing the envelope signal 10 with a slice level 16 using a comparator, not shown. In the vicinity of the ODF section 23, the land-groove discrimination signal 17 has a constant waveform 17a even when the light spot 4 passes a position where the guiding grooves 1 would have been if the ODF section 23 were not there. In the case where the ODF section 23 does not exist, the land-groove discrimination signal 17 becomes low-level, as shown by a broken line.

As a result, a directional signal 18 too switches correctly to low level and high level in response to the direction of movement of the light spot 4 in the case where the ODF section 23 does not exist, as shown by a broken line. In the case where the ODF section 23 does exist, the directional signal 18 acquires a waveform 18a which switches to a high level when the light spot 4 is moving from the inner circumference to the outer circumference.

Consequently, where a pulse 21a of an up-signal 21 (FIG. 9(i)) should have been produced, a pulse 22a of a down-signal 22 is erroneously produced. This makes accurate position detection of the optical head using the up-down counter impossible. As a result, the optical head cannot be accurately moved to the desired track.

SUMMARY OF THE INVENTION

An object of the present invention is to provide an optical disk drive which can accurately move an optical head to a desired track.

In order achieve the above object, the optical disk drive of the present invention uses an optical disk comprising grooves arranged concentrically or spirally, a pit section whereon information is predeterminedly recorded by uneven pits, and a level section which is formed by interrupting sections of the grooves, the optical disk drive being characterized in comprising: rotatively driving means for driving the optical disk rotatively; an optical head for converging a light beam on the optical disk and making it incident thereon as a light spot, and for receiving light reflected from the optical disk and converting it into an electric signal, the optical disk being rotatively driven by the rotatively driving means; optical head moving means for moving the optical head in the radial directions of the optical disk; an envelope detecting circuit for detecting an envelope signal, which is the envelope of the electric signal, by using a time constant circuit whose time constant is set so as to eliminate a high-frequency component that appears in the electric signal when the light spot passes the pit section; level section detecting means for releasing a level section detecting pulse which shows that the light spot is passing the level section, the pulse being released by detecting a pulse which appears in the envelope signal when the light spot passes the level section; time constant switching means for shortening the time constant for the duration of the release of the level section detecting pulse; a comparator for binarizing the envelope signal and releasing a binary envelope signal; and a discrimination circuit for achieving a discrimination signal which discriminates whether the light spot is on one of the grooves or on a portion between the grooves by using the level section detecting pulse to eliminate a pulse that appears in the binary envelope signal when the light spot passes the level section.

With the above arrangement, when the optical head is moved to a desired track by the optical head moving means, the envelope of the electric signal is found and the envelope signal is binarized. Then a land-groove signal is produced based on the binary envelope signal for determining whether the light spot is on one of the grooves or on a land located between the grooves. The number of grooves crossed by the optical head are counted using the land-groove signal, and the optical head can thereby be directed to the specified track. The tracks may be provided on the grooves or on the lands.

In the present invention, the optical head can be moved accurately to the specified track since, using the level section detecting pulse, it is being determined whether the light spot is on one of the grooves or on a portion between grooves by eliminating the pulse that appears in the binary envelope signal when the light spot passes the level section.

For a fuller understanding of the nature and advantages of the invention, reference should be made to the ensuing detailed description taken in conjunction with the accompanying drawings.

BRIEF DESCRIPTION OF THE DRAWINGS

FIG. 1 shows the overall configuration of an optical disk drive of the present invention.

FIG. 2 is an explanatory diagram showing the operation of each part of the optical disk drive shown in FIG. 1.

FIG. 3 is a circuit diagram of a binary circuit in the optical disk drive shown in FIG. 1.

FIG. 4 is a circuit diagram of a waveform processing circuit in the optical disk drive shown in FIG. 1.

FIG. 5 is an explanatory diagram showing the operation whereby an envelope signal is produced in the optical disk drive shown in FIG. 1.

FIG. 6 is a circuit diagram showing a land-groove discrimination circuit in the optical disk drive shown in FIG. 1.

FIG. 7 is an explanatory diagram showing the operation of a conventional optical disk drive.

FIG. 8 is a circuit diagram showing an envelope circuit used in the conventional optical disk drive.

FIG. 9 is an explanatory diagram showing the operation of the conventional optical disk drive in the case where an optical disk having an ODF section is used.

DESCRIPTION OF THE EMBODIMENTS

Figure 1:
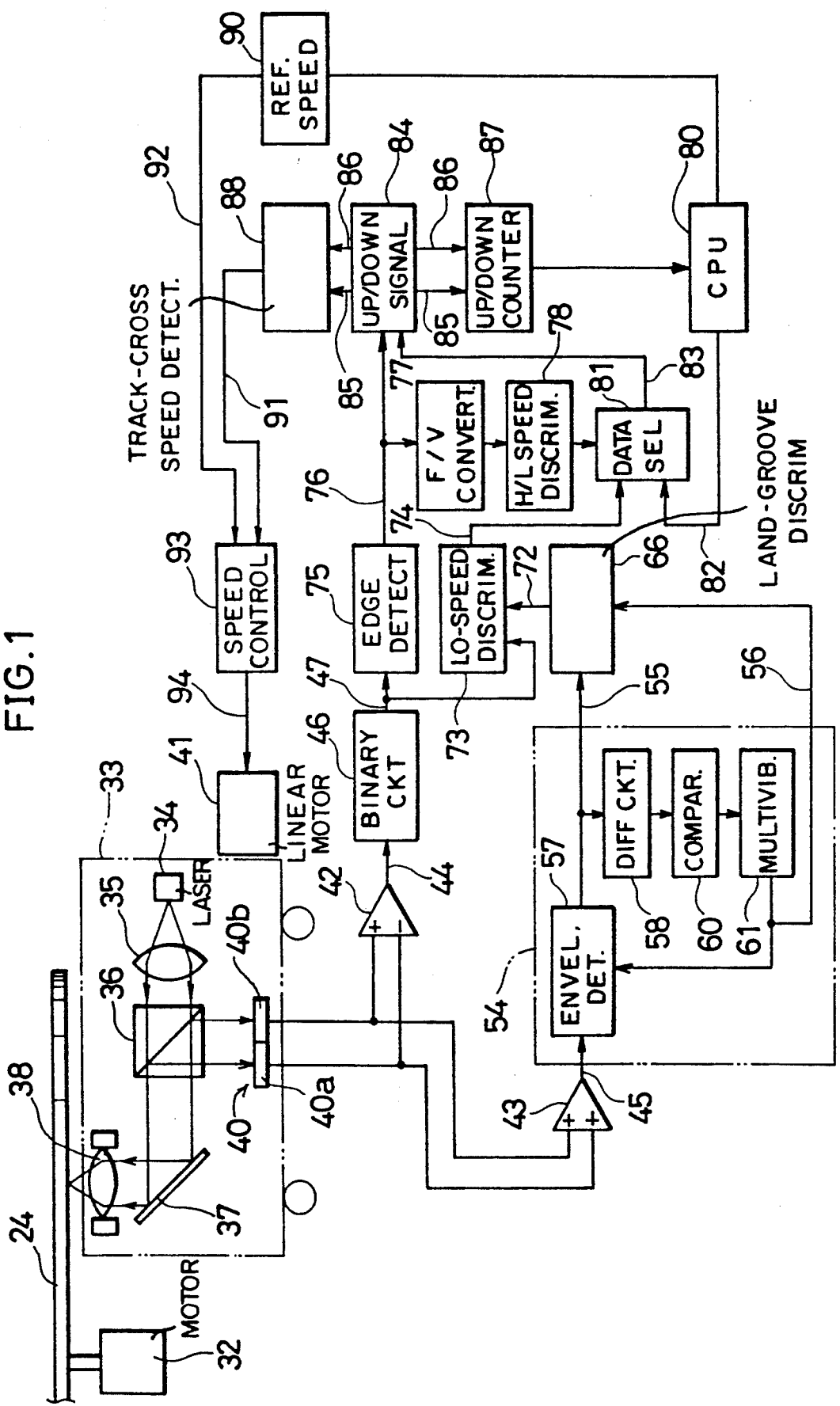
FIGS. 1 to 6 show an embodiment of the present invention.

An embodiment of the present invention is described hereinbelow, referring to FIGS. 1 to 6.

FIG. 2(a) schematically shows the configuration of an optical disk 24 used in the optical disk drive of the present embodiment.

Grooves 25 are arranged concentrically or spirally at specified intervals in the optical disk 24 in order to guide a light beam. Lands that form between the grooves 25 serve as tracks 26.

ID Sections 27 showing track numbers and sector numbers etc. are provided on the tracks 26. Information in the ID sections 27 is predeterminedly recorded by uneven pits having a specified depth (individual pits are not shown in the Figure, but are simply shown in their entirety by hatching).

The depth of the pits is set, for example, at $\lambda/4$ and the depth of the grooves 25 at, for example, $\lambda/8$, where $\lambda$ is the wavelength of a light beam which is incident on the optical disk 24.

An ODF section 28, which is a level section, is provided in the posterior side of the ID sections 27 for correcting DC offset of a tracking error signal. The grooves 25 are not formed in the ODF section 28; this prevents diffraction from occurring thereon. Consequently, the grooves 25 are interrupted only where the ODF section 28 is provided.

During track access, a light spot 31 moves orthogonally or substantially orthogonally with respect to the tracks 26 over the optical disk 24. However, since normally the optical disk 24 is rotating, a line 30 connecting the areas whereon the beam is incident cuts across the tracks 26 diagonally. In region A-B, the light spot 31 moves from an inner circumference of the optical disk 24 to an outer circumference. In region B-C, the light spot 31 moves from the outer circumference of the optical disk 24 to the inner circumference.

As shown in FIG. 1, the optical disk drive of the present embodiment carries out recording, reproduction or erasure of information on/from the optical disk 24 using the optical head 33, the optical disk 24 being rotatively driven at a specified angular or linear velocity by a spindle motor 32. The optical disk 24 is supported by the spindle motor 32.

In the optical head 33, a laser light emitted from a semiconductor laser 34 passes through a collimator lens 35 and becomes a parallel light beam. Then, it passes through a beam splitter 36 and is reflected by a reflecting mirror 37 substantially at a right angle and is converged on the optical disk 24 by a condenser lens 38.

The light reflected from the optical disk 24 reaches the beam splitter 36 via the condenser lens 38 and the reflecting mirror 37. In the beam splitter 36, it is reflected substantially at a right angle and becomes incident upon a light detector 40. The optical head 33 is designed to move in radial directions of the optical disk 24 by optical head moving means such as a linear motor 41.

The light detector 40 is divided, for example, into two light receiving sections 40a and 40b. Output signals released from the light receiving sections 40a and 40b are entered into a subtracter 42 and an adder 43. A tracking error signal 44 (FIG. 2(b)) which is the difference of the output signals is produced by the subtracter 42 and a total signal 45 (FIG. 2(f)) which is the sum of the output signals is produced by the adder 43. The tracking error signal 44 and the total signal 45 are modulated by the uneven pits when the light spot 31 passes the ID sections 27. Consequently, jagged waveforms 44a and 45a, which include high-frequency components, appear. Furthermore, when the light spot passes the ODF section 28, the tracking error signal 44 and the total signal 45 are modulated by the level section, whereon the grooves 25 are not formed. Consequently, straight-line waveforms 44b and 45b having constant levels appear.

The tracking error signal 44 is entered into a binary circuit 46 (FIG. 1), a binary tracking error signal 47 (FIG. 2(e)) being released therefrom.

Figure 2:
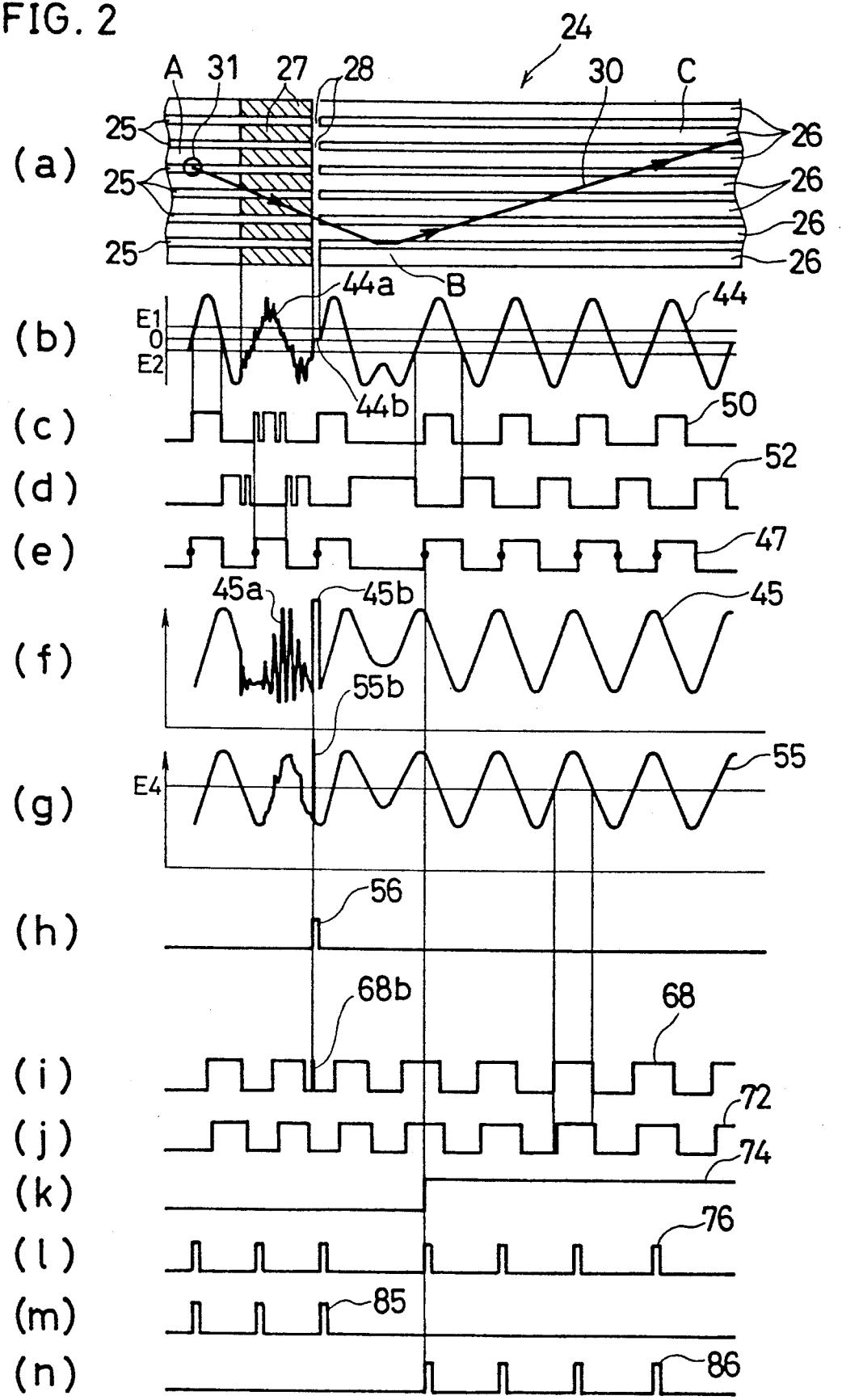
Figure 3:
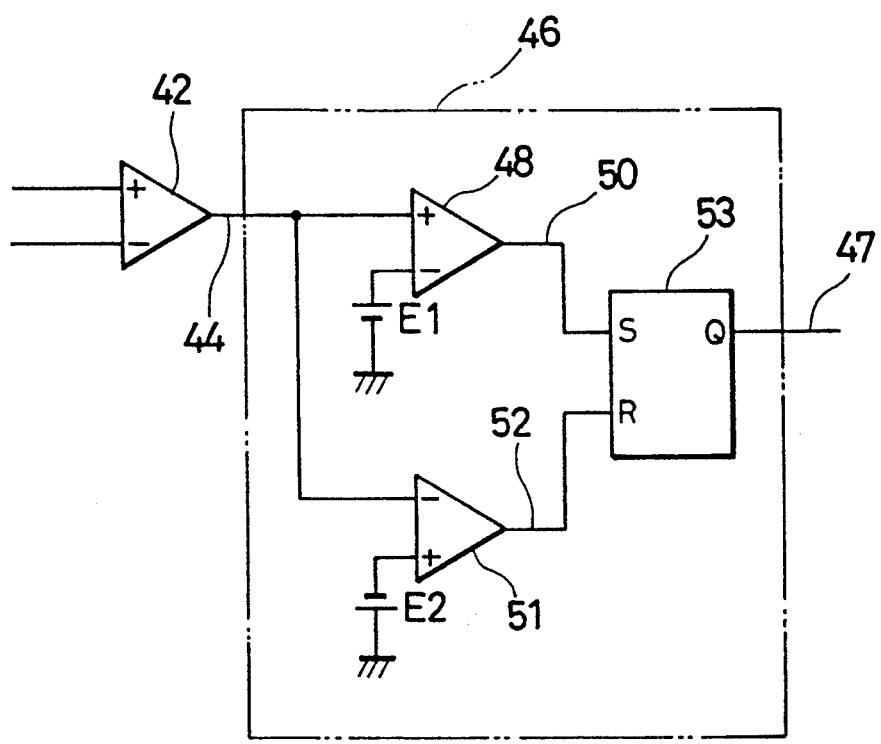

FIG. 3 shows a specific example of the binary circuit 46. The tracking error signal 44 is compared with a constant level E1 having a positive value in a comparator 48, a binary signal 50 (FIG. 2(c)) being released. The tracking error signal 44 is also compared with a constant level E2 having a negative value in a comparator 51, a binary signal 52 (FIG. 2(d)) being released. The two binary signals 50 and 52 are respectively entered into a set input terminal S and a reset input terminal R of an RS flip-flop 53. Accordingly, a binary tracking error signal 47 which is not affected by the disturbance in the waveforms 44a and 44b is released from an output terminal Q of the RS flip-flop 53.

The total signal 45 is entered into a waveform processing circuit 54 (FIG. 1), an envelope signal 55 (FIG. 2(g)) and an ODF section detecting signal 56 (FIG. 2(h)), which is a level section detecting signal, being released by the waveform processing circuit 54.

Figure 4:
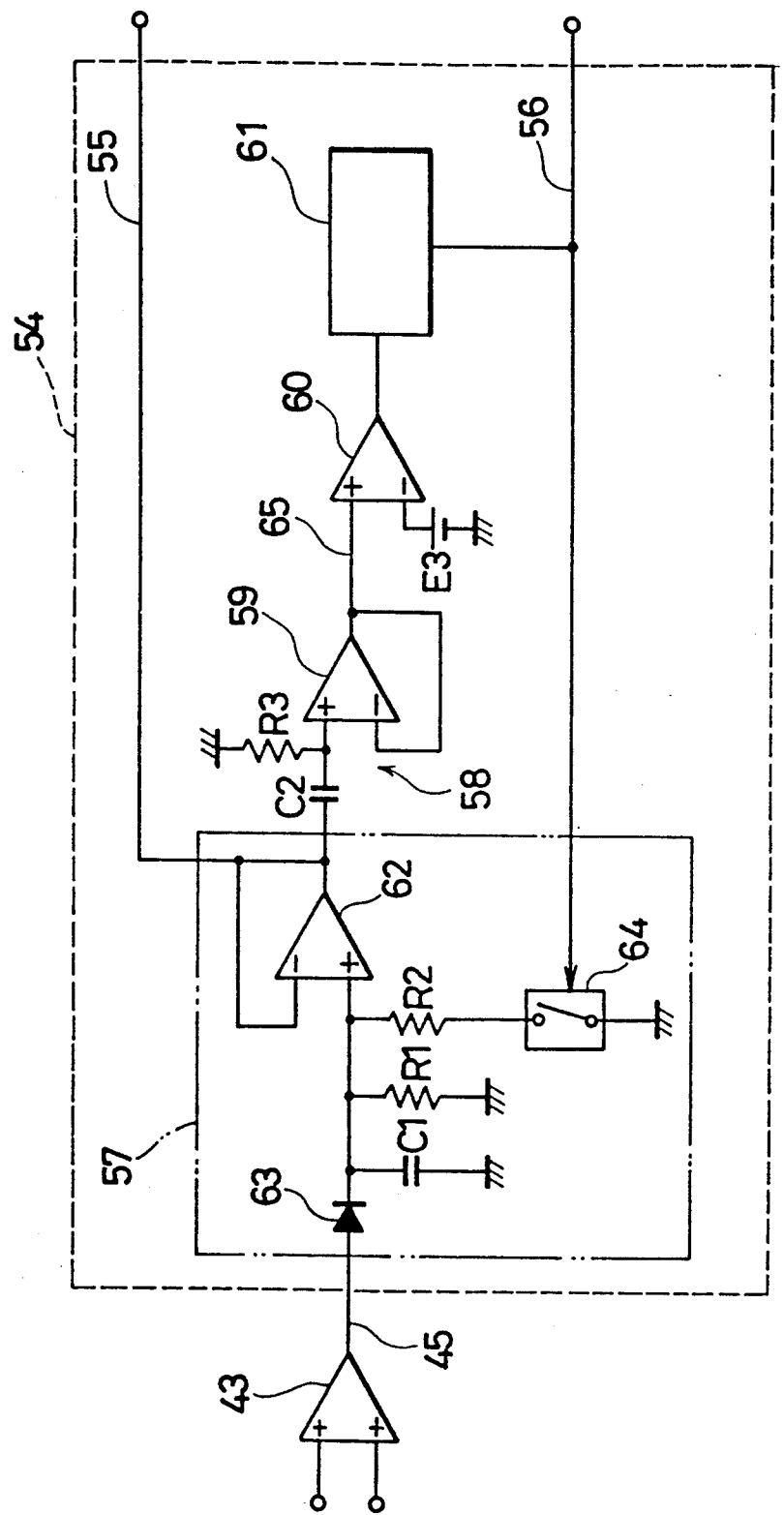
Figure 5:
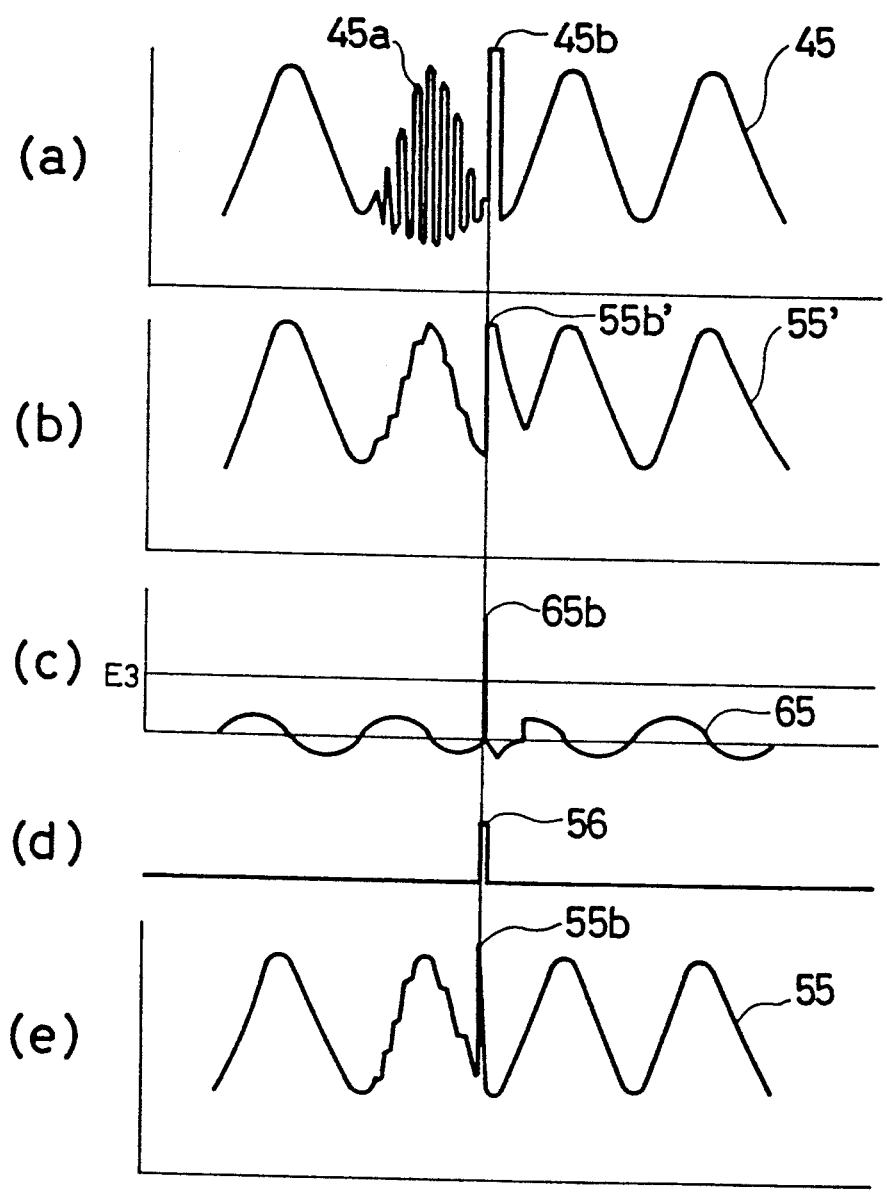

FIG. 4 shows a specific example of the waveform processing circuit 54. The waveform processing circuit 54 comprises an envelope detecting circuit 57, a differentiating circuit 58, a comparator 60 and a monostable multivibrator 61.

The envelope detecting circuit 57 comprises an operational amplifier 62, a diode 63 connected to a non-inverting input terminal of the operational amplifier 62, a capacitor C1 and resistors R1 and R2 connected in parallel between the non-inverting input terminal and ground, and a switch 64 connected in series with the resistor R2. The switch 64 opens and closes according to the output of the monostable multivibrator 61.

When the switch 64 is open, the time constant of the discharge of the capacitor C1 becomes C1.R1. When the switch 64 is closed, the time constant of the discharge of the capacitor C1 becomes C1.(R1.R2/(R1+R2)).

Here, since C1.R1 > C1.(R1.R2/(R1+R2)), the capacitor C1 is discharged faster when the switch 64 is closed compared to when it is open. The speed of discharge when the switch 64 is closed can be adjusted by changing the value of R2.

In order to simplify the discussion, the operation of the waveform processing circuit 54 when the switch 64 fixed in an open position is considered.

When the total signal 45, shown in FIG. 5(a), is entered into the envelope detecting circuit 57, an envelope signal 55' released from the envelope detecting circuit 57 rises suddenly when passing the ODF section 28, as shown in FIG. 5(b). After the light spot 31 has passed the ODF section 28, the envelope signal 55' acquires a gradually attenuated waveform 55b'. This is because the capacitor C1 is discharged according to the long time constant C1.R1.

The envelope signal 55' is entered into the differentiating circuit 58 (FIG. 4), which comprises an operational amplifier 59, a resistor R3 and a capacitor C2. A differentiated signal 65 (FIG. 5(c)) is released from the differentiating circuit 58. Here, in the case where the speed of movement of the light spot 31 with respect to the optical disk 24 is relatively low, the envelope signal 55' varies much more when the ODF section 28 is passed than when the grooves 25 are crossed. Consequently, when the light spot 31 crosses the ODF section 28, the differentiated signal 65 becomes a sharp pulse-shaped waveform 65b.

The level of the differentiated signal 65 is compared with a level E3 in the comparator 60, the level E3 being set to become lower than the level of the differentiated signal 65 when the ODF section 28 is being passed, and to become higher than the level of the differentiated signal 65 when the grooves 25 are being crossed.

When the level of the differentiated signal 65 is higher than the level E3, the monostable multivibrator 61 releases an ODF section detecting signal 56 (FIGS. 5(d) and 2(h)) for a specified duration. That is, the ODF section detecting signal 56 is released when the light spot 31 passes the ODF section 28.

In the above discussion of the operation of the waveform processing circuit 54, the switch 64 is presumed to be fixed in an open state. However, in the actual waveform processing circuit 54, the switch 64 closes when the ODF section detecting signal 56 is released. As a result, when the ODF section 28 is being passed, the capacitor C1 is discharged according to the short time constant C1.(R1.R2/(R1+R2)). Consequently, the envelope signal 55 acquires a pulse-shaped waveform 55b, as shown in FIG. 5(e) and FIG. 2(g).

It is conceivable that the switch 64 be altogether omitted and the time constant of the capacitor C1 be kept short at all times. However, in this case, the disturbance of the waveform 45a of the total signal 45, which occurs when the light spot 31 passes the ID sections 27, can no longer be eliminated sufficiently.

The envelope signal 55 and the ODF section detecting signal 56 are entered from the waveform processing circuit 54 into the land-groove discrimination circuit 66 (FIG. 1).

Figure 6:
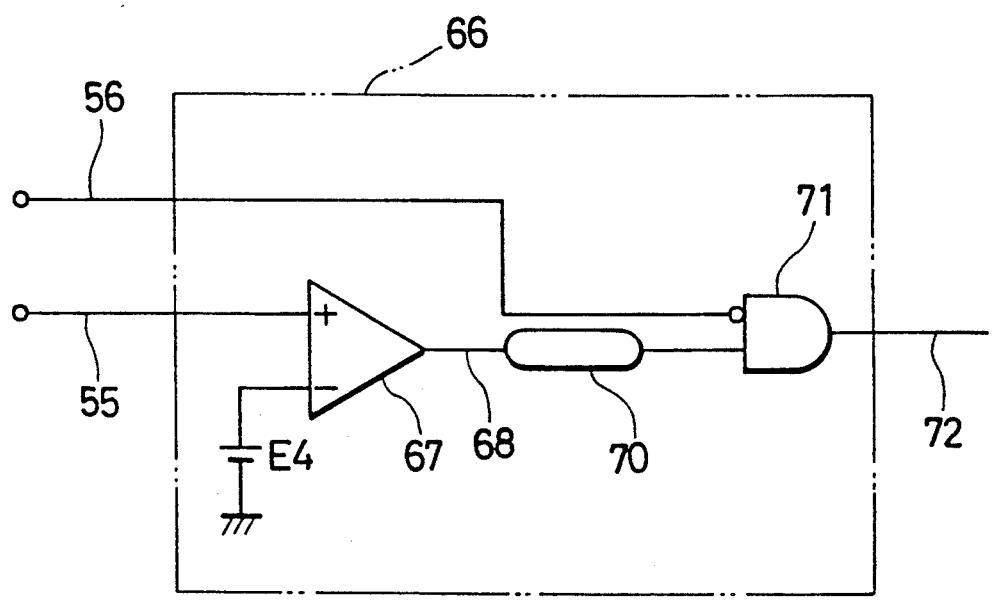
Figure 7:
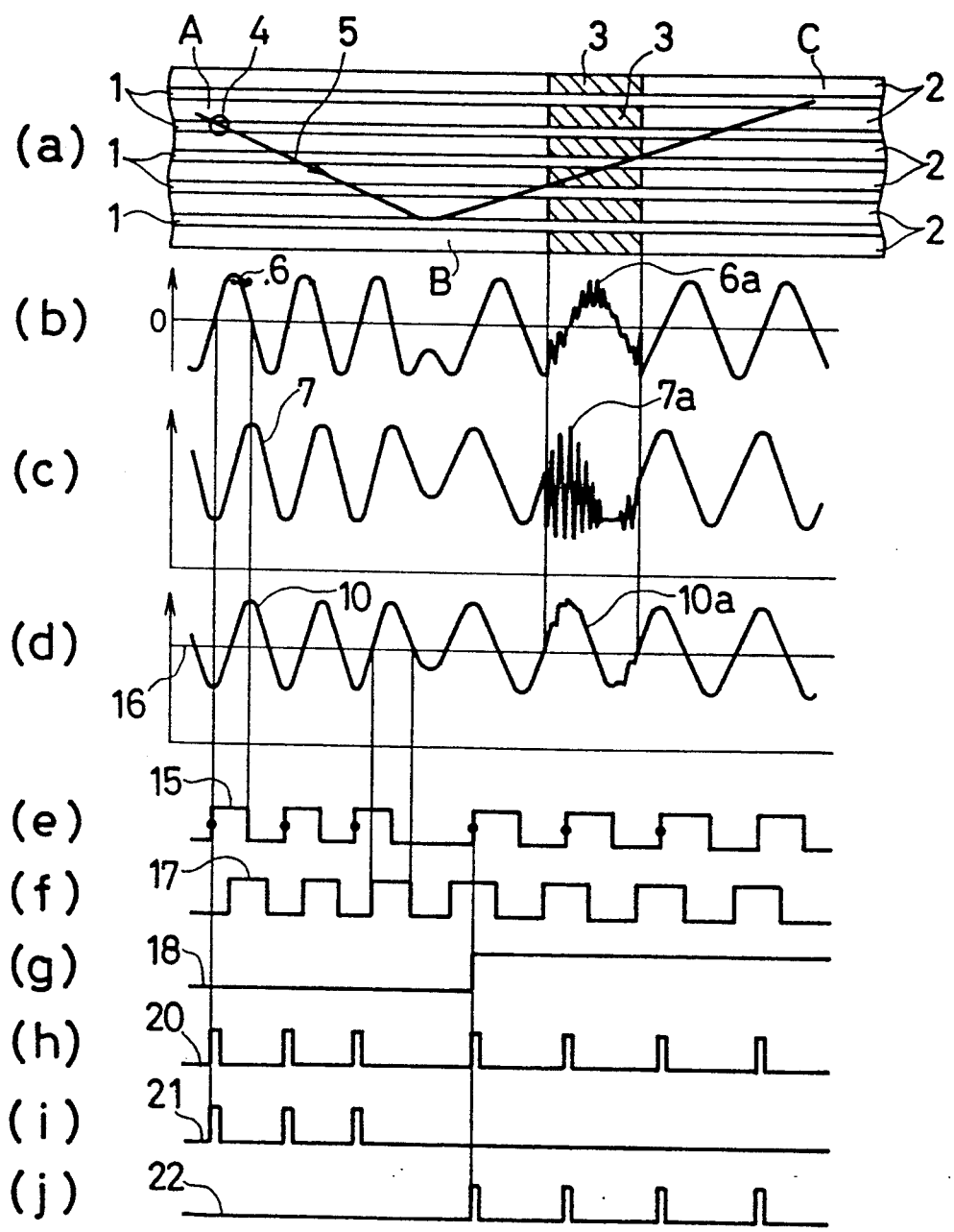
FIGS. 7 to 9 show a conventional example.
Figure 8:
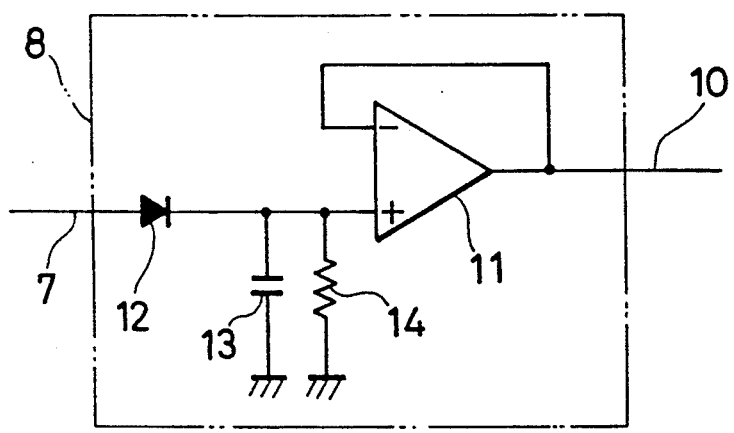
Figure 9:
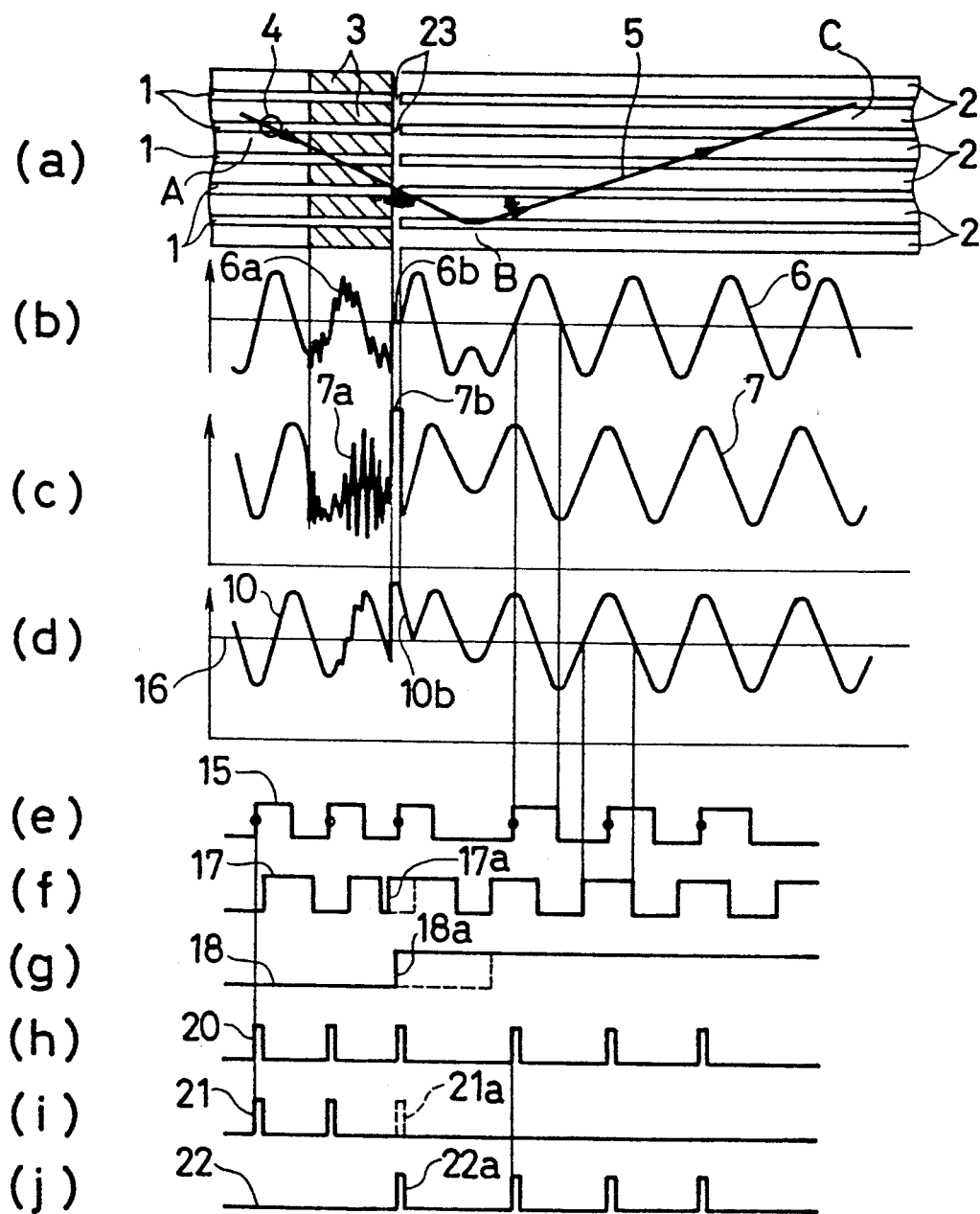

FIG. 6 shows a specific example of the land-groove discrimination circuit 66. The envelope signal 55 is compared with level E4 in the comparator 67, a binary envelope signal 68 (FIG. 2(i)) being released therefrom. A pulse 68b, corresponding to the pulse-shaped waveform 55b in the envelope signal 55, appears in the binary envelope signal 68 as well.

The binary envelope signal 68 is delayed for a specified duration by a delaying circuit 70. The delaying time is shorter than that corresponding to the pulse width of the ODF section detecting signal 56. Then, a logical product is found by entering the binary envelope signal 68 along with the inverted signal of the ODF section detecting signal 56 into an AND circuit 71. A land-groove discrimination signal 72 (FIG. 2(j)) with the pulse 68b eliminated therefrom is then achieved. The low level of the land-groove discrimination signal 72 corresponds to the grooves 25 and the high level corresponds to the tracks 26 on the lands.

The land-groove discrimination signal 72 and the binary tracking error signal 47 are entered into a low-speed direction discrimination circuit 73 (FIG. 1). A low-speed direction signal 74 (FIG. 2(k)) is achieved which corresponds to the direction of movement of the light spot 31. The low-speed direction signal 74 is achieved by latching the land-groove discrimination signal 72 when the binary tracking error signal 47 rises (FIG. 2(e)). The low level of the low-speed direction signal 74 shows that the direction of movement of the light spot 31 is from the inner circumference to the outer circumference of the optical disk 24, and the high level shows that the direction of movement of the light spot 31 is from the outer circumference to the inner circumference.

The binary tracking error signal 47 is also entered into a rising edge detecting circuit 75 and an edge detecting signal 76 (FIG. 2(1)) is released for a specified duration after the binary tracking error signal 47 rises. When the light spot 31 moves from the inner circumference to the outer circumference of the optical disk 24, the edge detecting signal 76 is released every time one of the grooves 25 is crossed. Likewise, when the light spot 31 moves from the outer circumference to the inner circumference of the optical disk 24, the edge detecting signal 76 is released every time one of the tracks 26 is crossed.

The edge detecting signal 76 is entered into an F/V (Frequency/Voltage) converting circuit 77 where F/V conversion is carried out. Accordingly, the track crossing speed of the light spot 31 is achieved. The output of the F/V conversion circuit 77 is entered into a high-low speed discrimination circuit 78 and is compared to a constant level. Based on this, a signal that differentiates whether the track crossing speed of the light spot 31 is equal to, greater than or less than a specified speed is released from the high-low speed discrimination circuit 78.

During track accessing, a CPU (Central Processing Unit) 80 that receives a track access command can identify the direction of movement of the optical head 33 by comparing the desired track number with the number of the track 26 whereon the light beam is currently incident. However, when the optical head 33 is moving with a slow speed, due to the eccentricity of the optical disk 24, it may happen that the light spot 31 moves in the direction opposite to that which the CPU 80 identifies.

That is, in the case where the tracks 26 (and the grooves 25) of the optical disk 24 are eccentrically formed, even if the optical head 33 is stationary, the light spot 31 crosses the tracks 26 (and the grooves 25) due to the movement of the tracks 26 in a radial direction.

Consider a case where the speed of movement of the light spot 31 along the radial directions is low compared to the speed of movement of the tracks 26 due to eccentricity. Here, the relative direction of movement of the light spot 31 with respect to the tracks 26 consequently becomes the direction opposite to the direction actually desired.

On the other hand, when the speed of movement of the light spot 31 along the radial directions is higher than the speed of movement of the tracks 26 due to eccentricity, the relative direction of movement of the light spot 31 with respect to the tracks 26 corresponds to the direction actually desired.

Therefore, during access, when the speed of movement of the light spot 31 is low, the correct direction of movement of the light spot 31 can be detected by using the direction detected by the low-speed direction discrimination circuit 73; and when the speed of movement of the light spot 31 is high, the correct direction of movement of the light spot 31 can be detected by using the direction identified by the CPU 80.

Accordingly, during low speed, a low-speed directional signal 74 is selected in a data selector 81 based on the output of the high-low speed discrimination circuit 78. During high speed, an access directional signal 82 identified by the CPU 80 is selected in the data selector 81. Thus, an accurate directional signal 83 is achieved.

The edge detecting signal 76 and the directional signal 83 are entered into an up-down signal producing circuit 84. When the directional signal 83 is at a low level, an up-signal 85 (FIG. 2(m)) is produced in the up-down signal producing circuit 84 based on the edge detecting signal 76; when the directional signal 83 is at a high level, a down-signal 86 (FIG. 2(n)) is produced in the up-down signal producing circuit 84 based on the edge detecting signal 76. The low-speed directional signal 74 shown in FIG. 2(k) is selected in the data selector 81 as the directional signal 83.

The up-signal 85 is released every time one of the grooves 25 is crossed when the light spot 31 moves from the inner circumference to the outer circumference of the optical disk 24. The down-signal 86 is released every time one of the tracks 26 is crossed when the light spot 31 moves from the outer circumference to the inner circumference.

An up-down counter 87 counts the up-signal 85 and the down-signal 86, and the number of tracks 26 crossed by the light spot 31 can thus be detected. The detection of the number of tracks 26 can be carried out accurately even if the optical disk 24 exhibits eccentricity.

The up-signal 85 and the down-signal 86 are also entered into a track crossing speed detecting circuit 88 and the speed and the direction of movement of the light spot 31 in the radial directions are detected in the track crossing speed detecting circuit 88 during accessing by speed detecting means such as an F/V convertor.

The amount moved during accessing by the optical head 33 is detected by the CPU 80 based on the output of the up-down counter 87. Based on this, a reference speed corresponding to the distance remaining from the desired track is produced by the reference speed producing circuit 90.

A moving speed signal 91 from the track crossing speed detecting circuit 88 and a reference speed signal 92 from the reference speed producing circuit 90 are entered into a speed controlling circuit 93. Based on the difference between the two, a speed controlling signal 94 is released to a linear motor 41 from the speed controlling circuit 93. Accordingly, the linear motor 41 is controlled by the speed controlling signal 94 so that the moving speed of the optical head 33 coincides with the reference speed. The optical head 33 is thus driven toward the desired track at the speed most suitable to the distance remaining.

In the present embodiment, the elimination has been described of the pulse 68b that appears in the binary envelope signal 68 due to the ODF section 28. However, the invention is effective also with respect to a pulse which appears due to a defect, such as a defect in the grooves 25, on the optical disk 24 occurring during its manufacture.

Further, in the optical disk 24 of the present embodiment, the lands between the grooves 25 have been used as tracks 26; however, the grooves 25 may equally be used as tracks 26.

Specifically, as the optical disk 24, the following kinds may be used: a laser disk whereon information is recorded by uneven pits; a magneto-optical disk having a vertically magnetized film formed thereon; a perforated-type disk whereon information is recorded by perforating it using a light beam; a phase change-type disk using phase change; and a photochromic-type disk which uses the changes in the absorption coefficient occurring when light is incident thereon. A magnetic disk may equally be used as long as the grooves 25 are provided thereon.

The optical disk drive may be of any type as long as track access is carried out using a light beam. That is to say, recording or reproduction of information need not necessarily be carried out using a light beam: recording or reproducing may be carried out using a magnetic head, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk drive, using an optical disk comprising:

grooves arranged concentrically or spirally;

a pit section whereon information is predeterminedly recorded by uneven pits having a specified depth; and a level section whereon grooves and pits do not exist, which is level and interrupts sections of the grooves, the optical disk drive comprising:

rotatively driving means for rotatively driving the optical disk;

an optical head for converging a light beam as a light spot on the optical disk, the optical disk being driven by the rotatively driving means, and for receiving light reflected from the optical disk and converting it into an electric signal;

optical head moving means for moving the optical head along radial directions of the optical disk;

an envelope detecting circuit for detecting an envelope signal, the envelope signal being an envelope of the electric signal, by a time constant circuit which is set to eliminate high-frequency components that appear in the electric signal when the light spot passes the pit section;

level section detecting means for releasing a level section detecting pulse, the level section detecting pulse showing that the light spot is passing the level section, by detecting a pulse that appears in the envelope signal when the light spot passes the level section, the pulse showing that the light spot is passing the level section;

time constant switching means for shortening the time constant for the duration of release of the level section detecting pulse;

a comparator for binarizing the envelope signal and for releasing a binary envelope signal; and a discrimination circuit for releasing a discrimination signal, the discrimination signal determining whether the light spot is incident on one of the grooves or on an area located between the grooves by using the level section detecting pulse to eliminate a pulse which appears in the binary envelope signal when the light spot passes the level section.

2. The optical disk drive as set forth in claim 1, wherein the time constant circuit comprises:

a capacitor;

a first resistor connected in parallel to the capacitor; and a second resistor connected to the time constant switching means so as to be parallel to the capacitor.

3. The optical disk drive as set forth in claim 2, wherein the level section detecting means comprises:

a differentiating circuit for releasing a differentiated signal by differentiating the envelope signal;

comparing means for releasing an output signal whose level is higher than the level of the differentiated signal released when the light spot passes the grooves; and a monostable multivibrator for releasing a level section detecting pulse based on the output of the comparing means, the level section detecting pulse being released for a specified duration.

4. The optical disk drive as set forth in claim 3, wherein the discrimination circuit comprises:

a delaying circuit for delaying the binary envelope signal by a duration shorter than the specified duration of the release of the level section detecting pulse; and a logic circuit for eliminating the pulse appearing in the binary envelope signal when the light spot passes the level section, based on the delayed binary envelope signal and the level section detecting pulse.

5. The optical disk drive as set forth in claim 1, wherein the optical head comprises:

a light detector, having two light receiving sections, for receiving reflected light, and includes:

an adder for releasing the electric signal by adding output signals released from the two light receiving sections;

a subtracter for releasing an error signal by subtracting the output signals from the two light receiving section, the error signal showing the shifting of the light spot from the grooves; and a binary circuit for binarizing the error signal and releasing a binary error signal.

6. The optical disk drive as set forth in claim 5, wherein, in order that the binary error signal released therefrom remain unaffected by high-frequency components that appears in the error signal when the light spot passes the pit section, the binary circuit comprises:

a first comparator for comparing the error signal with a constant positive level;

a second comparator for comparing the error signal with a constant negative level; and a flip-flop for releasing the binary errors signal based on outputs of the first and second comparators.

7. The optical disk drive as set forth in claim 6, wherein the optical disk drive includes a direction discrimination circuit for latching the discrimination signal according to a specified timing which is synchronous to the binary error signal, and determining the direction of movement of the optical head based on whether the latched signal is at a high level or at a low level.

8. The optical disk drive as set forth in claim 7, wherein the optical disk drive includes:

a rising edge detecting circuit for releasing an edge detecting pulse when the binary error signal rises; and an up-down signal producing circuit for producing an up-signal or a down-signal by classifying the edge detecting pulse as the up-signal or the down-signal according to whether an output signal of the direction discrimination circuit is at a high level or at a low level, the up-signal showing that the light spot is crossing the grooves from an inner to an outer circumference, and the down-signal showing that the light spot is crossing the grooves from the outer to the inner circumference.

* * * * *